United States Patent [19]

Rehrig

[11] 4,286,795

[45] Sep. 1, 1981

[54] TELESCOPING SHOPPING CART

[76] Inventor: B. Houston Rehrig, 1401 S. Oak Knoll Ave., Pasadena, Calif. 91109

[21] Appl. No.: 36,647

[22] Filed: May 7, 1979

[51] Int. Cl.³ .............................................. B62B 1/10
[52] U.S. Cl. ........................ 280/33.99 H; 280/DIG. 4
[58] Field of Search ................ 280/33.99 R, 33.99 H, 280/33.99 S, 33.99 F, 33.99 T, 47.26, 651, DIG. 4; 186/1 C

[56] References Cited

U.S. PATENT DOCUMENTS

| | | | |
|---|---|---|---|
| 2,605,116 | 7/1952 | Alexander | 280/33.99 H |
| 2,644,695 | 7/1953 | Enders | 280/33.99 H |
| 2,738,201 | 3/1956 | Spears | 280/33.99 H |
| 2,868,556 | 1/1959 | Cauthon | 280/33.99 H |
| 3,353,836 | 11/1967 | Davis | 280/33.99 H |

Primary Examiner—Joseph F. Peters, Jr.
Assistant Examiner—Michael Mar

[57] ABSTRACT

A cart having a basket, including front, bottom, rear and opposed rectangular side panels which is attached to a wheeled cart frame. The rear panel is pivotally attached to the upper rear portion of the basket for nesting. The lower portion of the basket is pivotally attached to the frame and is maintained in a horizontal use position by two opposed latching protrusions attached to the basket and having notches which engage the edges of openings positioned on each side of the frame. During nesting, the basket is automatically rotated to a predetermined upper position whereby the front portion of the basket is tilted upwardly so that it can enter inside the rear portion of the next forward cart. When the latching notches are disengaged from the openings, the basket is automatically rotated upward by the force of latching springs coupling the basket to the frame. A substantially U-shaped rod extends horizontally along the front and side panels wherein each of its free ends is attached to the latching protrusions. A spring-loaded mechanism urges the U-shaped rod toward a forward rest position. Impact of the rod with the next forward cart during nesting results in its rearward deflection, thereby disengaging the latching protrusions from the latching edges so that the basket can be rotated upwardly to the predetermined upper position to permit nesting.

21 Claims, 13 Drawing Figures

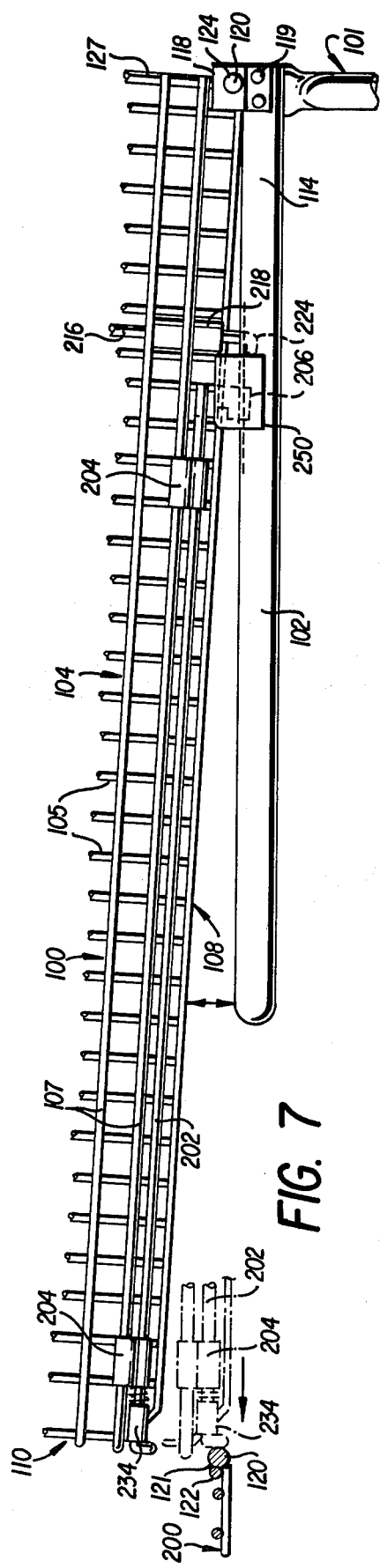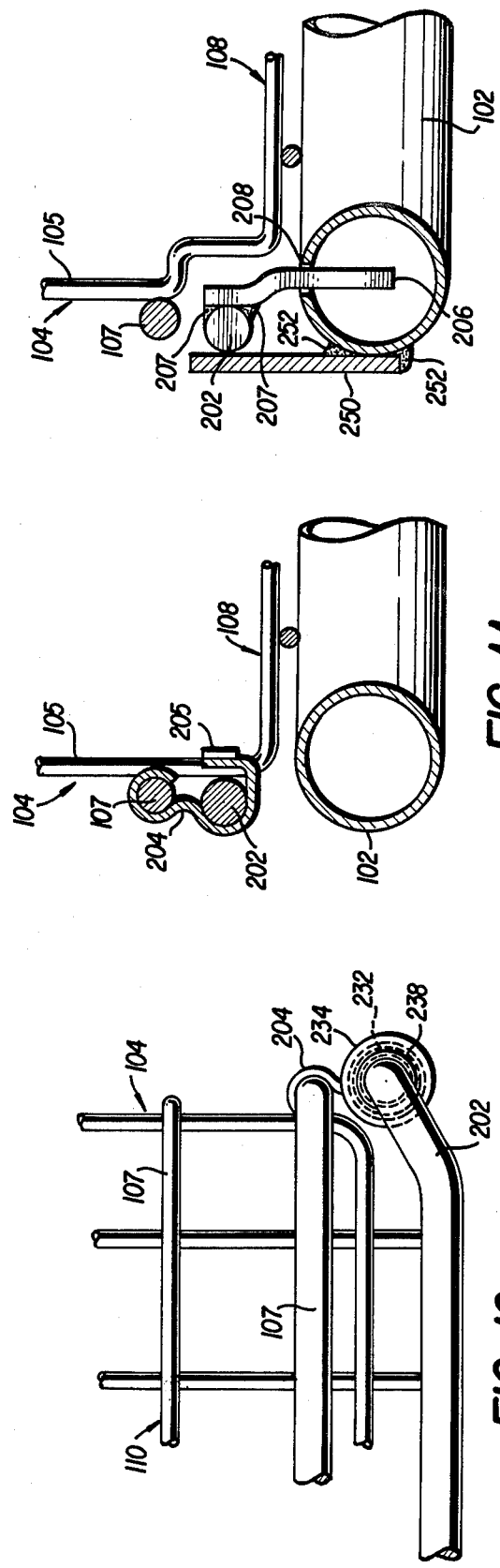

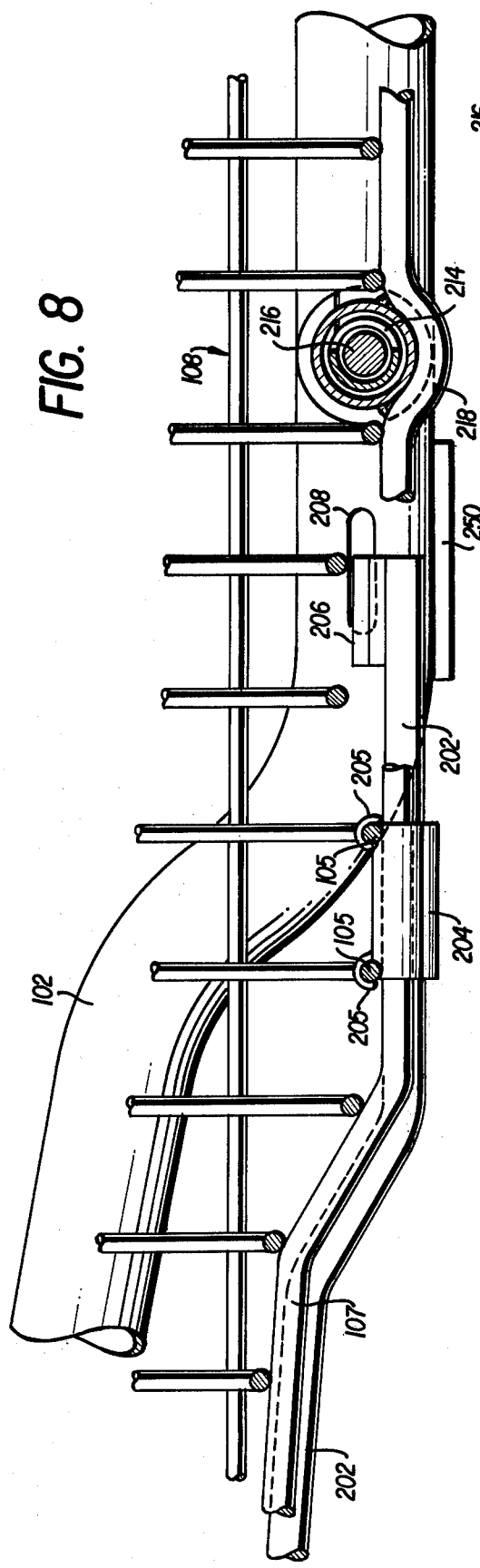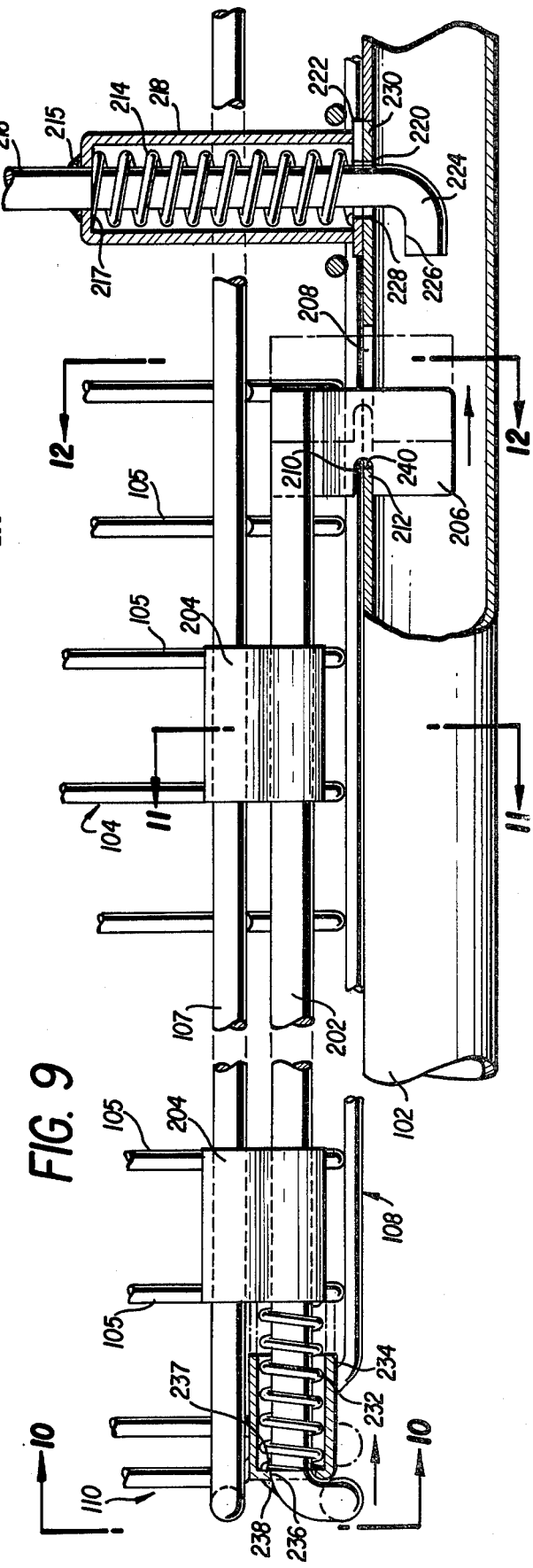

TELESCOPING SHOPPING CART

BACKGROUND OF THE INVENTION

The invention relates generally to the field of carts used for supermarkets and the like, and is directed particularly to a new and novel nestable cart having side panels, each side panel having opposed edges which are parallel (e.g., rectangular side panels).

The grocery carts of the prior art generally have a basket design wherein the bottom of the basket is tapered upwardly, the top of the basket is tapered downwardly, the pivotable connected rear gate is slanted forward from a vertical position, and the side panels are tapered inwardly. Accordingly, the side panels of this prior art design are in the form of a trapezium. This trapezium design provides a basket whose forward side portion is narrower than its rear side portion. Such an irregular side panel design, however, was necessary to permit nesting of one cart with the next forward cart. That is, the narrower forward portion of the cart can easily fit within the rear portion of the next forward cart. The slant of the rear gate was also necessary so that the gate would not contact the upwardly tapered bottom panel while the gate was being pivoted upwardly during nesting.

The trapezium design, however, produces a cart which has limited space due, in part, to the inward slant of the rear gate. To rectify this, the prior art carts have been modified to have deeper baskets. Concomitant with this design modification is the inconvenience to shoppers or store employees by requiring them to bend over farther to remove items from the bottom of the basket.

The construction of a basket having more cubic capacity has become more necessary in recent years with the purchasing of larger quentities of items. The following, for example, has led to the purchasing of larger quantities by shoppers in recent years: (1) the scarcity and higher cost of fuel has resulted in fewer trips with higher purchases per trip; (2) the sale of prepackaged goods which require more space; and (3) bulk purchases in an attempt to compensate for the impact of rising food costs. In addition, the concept of one-store shopping whereby all household, appliances, clothing and gardening needs are being purchased at a particular store has added to the demand for larger shopping carts having more capacity.

The design consideration incident to the construction of a larger or deeper basket, however, has also dictated the necessity of utilizing a nesting feature. The use of the larger wheeled cart baskets without a nesting feature requires so much space that it is virtually impractical in most stores since space is an obvious factor. Utilizing the trapezium side panel design to permit nesting, however, while compensating for its concomitant reduced capacity has resulted in a deeper basket with the burden on shoppers and cashiers to bend down farther to remove items from the basket. Consequently, the prior art carts, in order to reduce storage space, have relied upon the trapezium side panel design for permitting nesting while concomitantly providing a deeper basket to achieve the same cubic capacity inherently lost by the trapezium design.

The instant invention overcomes the disadvantages of the prior art designs by providing a basket whose side panels are rectangular while still permitting the carts to be nested. The volume of space lost within the cart by making the sides an irregular shape (i.e., trapezium), means that it is necessary to have a deeper basket than would be required if the side panels were rectangular. As will be shown in the following specification, if a basket having a rectangular shaped side panel and a trapezium basket are of the same maximum height overall, the overall bottom of the rectangular basket can be farther from the floor while providing increased capacity.

Although the invention utilizes side panels wherein each panel has opposed edges which are parallel (e.g., rectangular), nesting is obtained, nevertheless, through the use of a new and novel structure for latching whereby the basket is maintained in a horizontal position during use and automatically rotated to a predetermined upper position during nesting. In this manner, the forward portion of the basket can be nested within the rear portion of the next forward basket. While certain over-the-counter designed shopping carts utilize the feature of pivoting a rectangular basket from a horizontal to a vertical position during nesting, these baskets aren't received within the next forward basket. Consequently, storage space is lost due to incomplete nesting. On the other hand, where nesting is more complete the shape of the basket has been modified to permit nesting; this has inherently resulted in the capacity of the basket being sacrificed. For example, U.S. Pat. No. 2,605,116 shows a nestable shopping cart where the basket can be rotated from a horizontal position to a vertical position. The bottom of the basket, however, is downwardly tapered (i.e., trapezoidal) so that it can fit within the upper portion of the next forward basket. Due to tapering, consequently, this cart must be designed to have a deeper basket to compensate for its reduced capacity resulting in an inconvenience to shoppers. Furthermore, the '116 design requires the basket to be manually rotated to its position for nesting, resulting in a further inconvenience to shoppers.

SUMMARY OF THE INVENTION

It is the overall object of this invention to provide a new improved cart which overcomes the disadvantages of the prior art devices.

A specific object of this invention is to provide a new and improved cart that can hold a larger quantity of purchases.

Another specific object is to provide a new and improved cart which has a bottom panel farther from the floor so that the shopper or cashier need not bend over so far to remove items from the bottom of the basket.

Still another specific object is to provide a new and improved basket whereby each side panel has opposed edges which are parallel (e.g., rectangular).

A further specific object is to provide a new and improved cart whereby the foregoing is achieved while permitting the baskets to be nested.

This invention makes possible the nesting of carts having rectangular side panels, by providing a basket that can be tilted upward at its front end during nesting so that its front panel can enter inside the rear portion of the next forward basket. The invention further comprises a new and improved mechanical structure which automatically tilts the basket upward to a predetermined position for nesting.

The invention comprises a cart having a wheeled cart frame and a basket having front, bottom, rear and opposed rectangular side panels. The rear of the basket is pivotally attached to the frame and is maintained in a horizontal use position by metal latching protrusions attached to the basket; the protrusions have notched portions which engage the edges of openings positioned on each side of the frame. During nesting, the basket is automatically rotated to a predetermined upper position so that it can enter inside the rear portion of the next forward basket. When the latching notches are disengaged from the edges, the basket is automatically rotated upwardly by the force of latching springs coupling the basket to the frame.

A substantially U-shaped rod extends horizontally along the front and side panels of the basket; each of its free ends are attached to a latching protrusion. The rod is spring-loaded whereby it is urged in a forward position. Upon impact of the rod with a hinging rod of the next forward cart, the U-shaped rod is deflected rearwardly to disengage the latching protrusions from the latching edges. Consequently, the basket is thereby rotated upwardly to the predetermined upper position for nesting by the force of the latching springs.

BRIEF DESCRIPTION OF THE DRAWINGS

FIG. 7 is a fragmentary sectional view showing the operation of the releasing and latching mechanism of the cart of FIG. 4 during nesting.

FIG. 8 is an enlarged fragmentary sectional view of the latching mechanism taken along line 8—8 of FIG. 4.

FIG. 9 is an enlarged fragmentary sectional view, partially in section, showing the releasing and latching mechanism of the cart shown in FIG. 4.

FIG. 10 is a sectional view of the releasing mechanism taken along line 10—10 of FIG. 9.

FIG. 11 is a sectional view showing the guiding members taken along line 11—11 of FIG. 9.

FIG. 12 is a sectional view showing the latching mechanism taken along line 12—12 of FIG. 9.

DESCRIPTION OF THE PREFERRED EMBODIMENT

Figure 1:
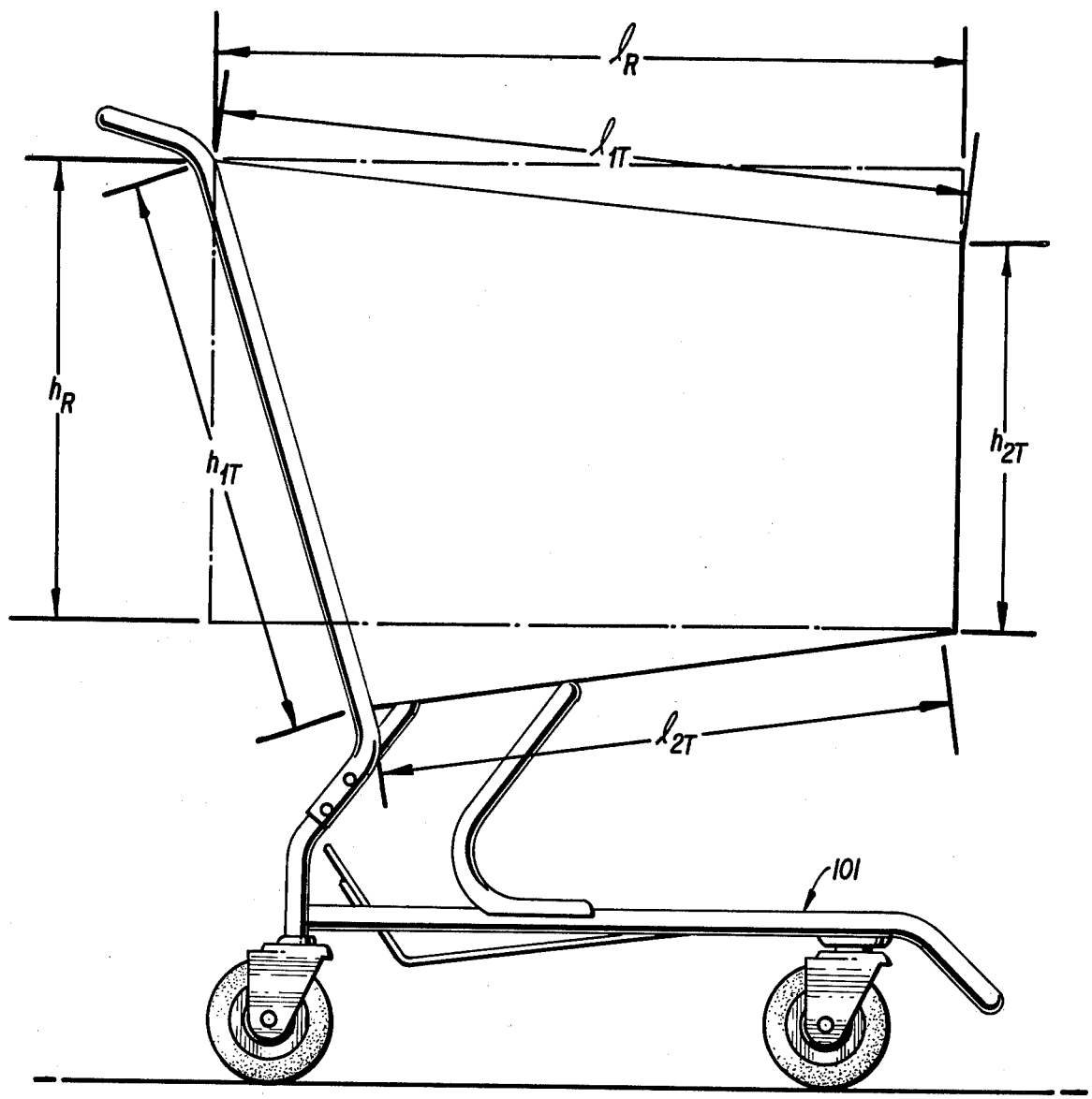
FIG. 1 is a side view of a prior art cart showing its comparison to a nestable basket design according to the invention.

A relative comparison of the trapezium side panel design and the rectangular side panel design of the instant invention is necessary to fully appreciate the advantages of the invention, in particular, its increased capacity and increased height from the floor. FIG. 1 shows a prior art grocery cart with a trapezium shaped side panel having the following length and height dimensions: $l_{1T}$, $l_{2T}$, $h_{1T}$, $h_{2T}$. As can be seen from FIG. 1, the pivotally attached rear panel having length $h_{1T}$ is slanted inwardly to permit its forward movement during nesting. It is also essential for nesting that the side panels be tapered inwardly from the rear to the front of the basket (see e.g., FIG. 5 of U.S. Pat. No. 3,999,774). The area of the trapezium side panel (Area$_T$) can be determined from the following equations:

$$\text{Area}_T = ((l_{1T} + l_{2T})/2) * ((h_{1T} + h_{2T})/2)$$

Also shown in FIG. 1 is a relatively positioned rectangular basket. The top plan views of the rectangular trapezium baskets are identical with corresponding taper (i.e., equal width). The rectangular basket is positioned so that the rectangular and trapezium designs have their upper rear edges and their lower front edges coinciding, respectively. As can be seen from the drawing, the trapezium basket is deeper than the rectangular basket at its rear portion, thereby resulting in inconvenience to shoppers. The rectangular basket has a height $h_R$ and length $l_R$. The area of this rectangular side panel (Area$_R$) is: Area$_R = h_R * l_R$.

Substituting actual dimensions and solving for the respective areas shows an increased capacity of the rectangular design; for example, assuming the following actual dimensions: $l_{1T} = 29.25$ in.; $l_{2T} = 22.37$ in.; $h_{1T} = 21$ in.; $h_{2T} = 15$ in.; $h_{1R} = 20$ in. and $l_{1R} = 29$ in. The area of the trapezium would be equal to Area$_T = 464.58$ in.$^2$, while the area of the rectangular side panel would be equal to Area$_R = 580.00$ in.$^2$. Since the widths of the baskets are equal, the volume of the baskets can be compared. That is the volume of the rectangular basket is greater than the volume of the trapezium basket; in fact, the increased capacity would be equal to 24.84%.

As can be seen from this relative comparison, the trapezium basket is deeper at its rear portion resulting in inconvenience to the shopper, while the rectangular design has a bottom panel which is less deep along its corresponding length. Accordingly, shoppers or employees will not need to bend over so far to remove items from, or place items in, the basket. Furthermore, it follows from the above calculations that if the rectangular and trapezium baskets have the same maximum overall height, length, width and same cubic capacity, the bottom of the rectangular basket can be 8 to 10 inches farther from the floor than the bottom of a trapezium basket.

Figure 2:
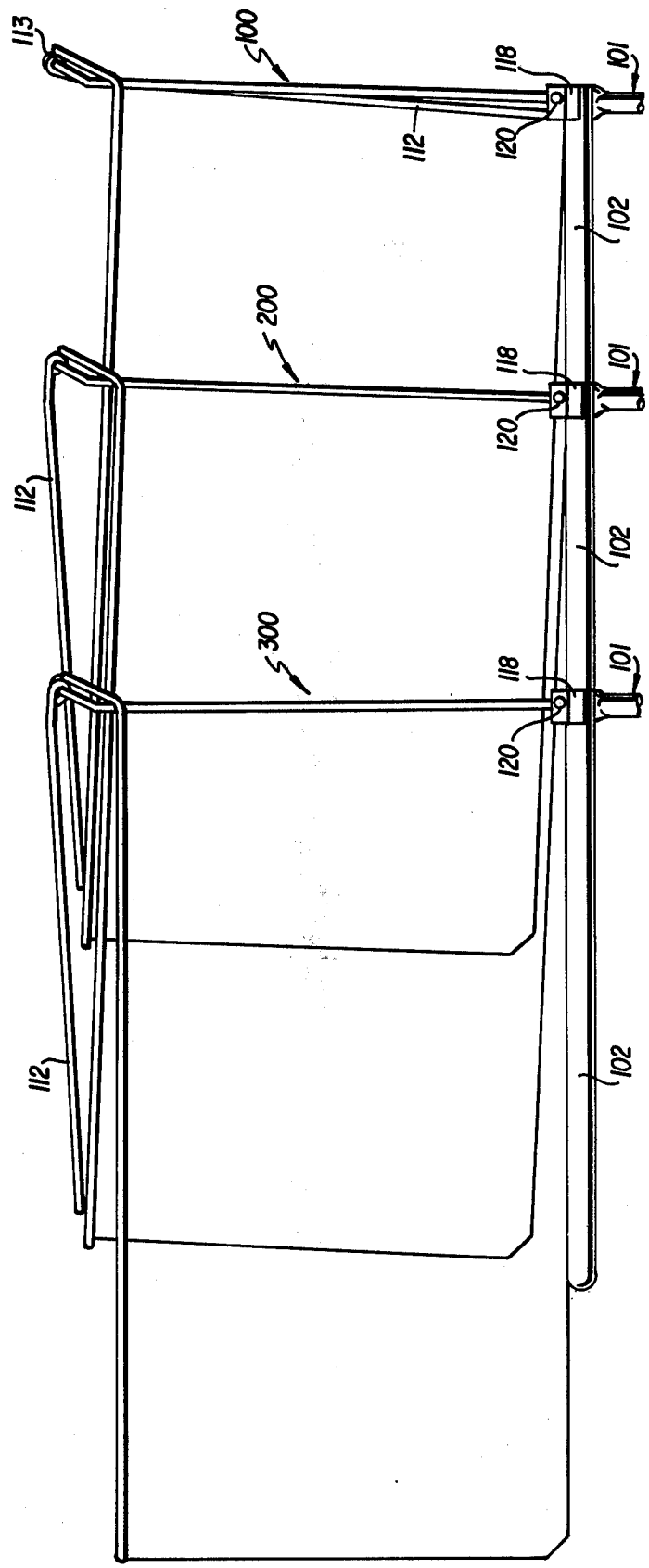
FIG. 2 is a side view of several carts according to this invention showing them in a nested relationship.
Figure 3:
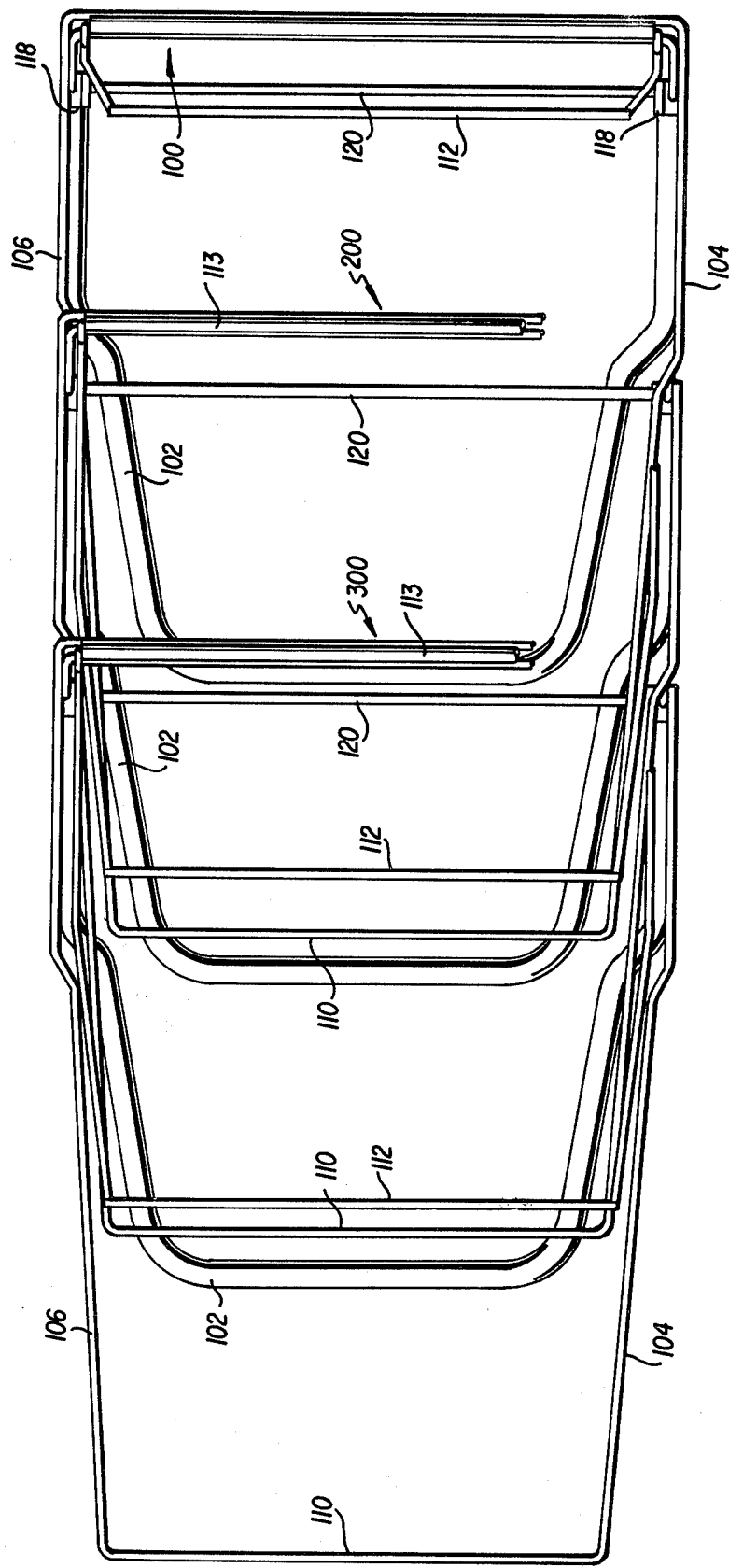
FIG. 3 is a top plan view of the nested carts shown in FIG. 2.
Figure 4:
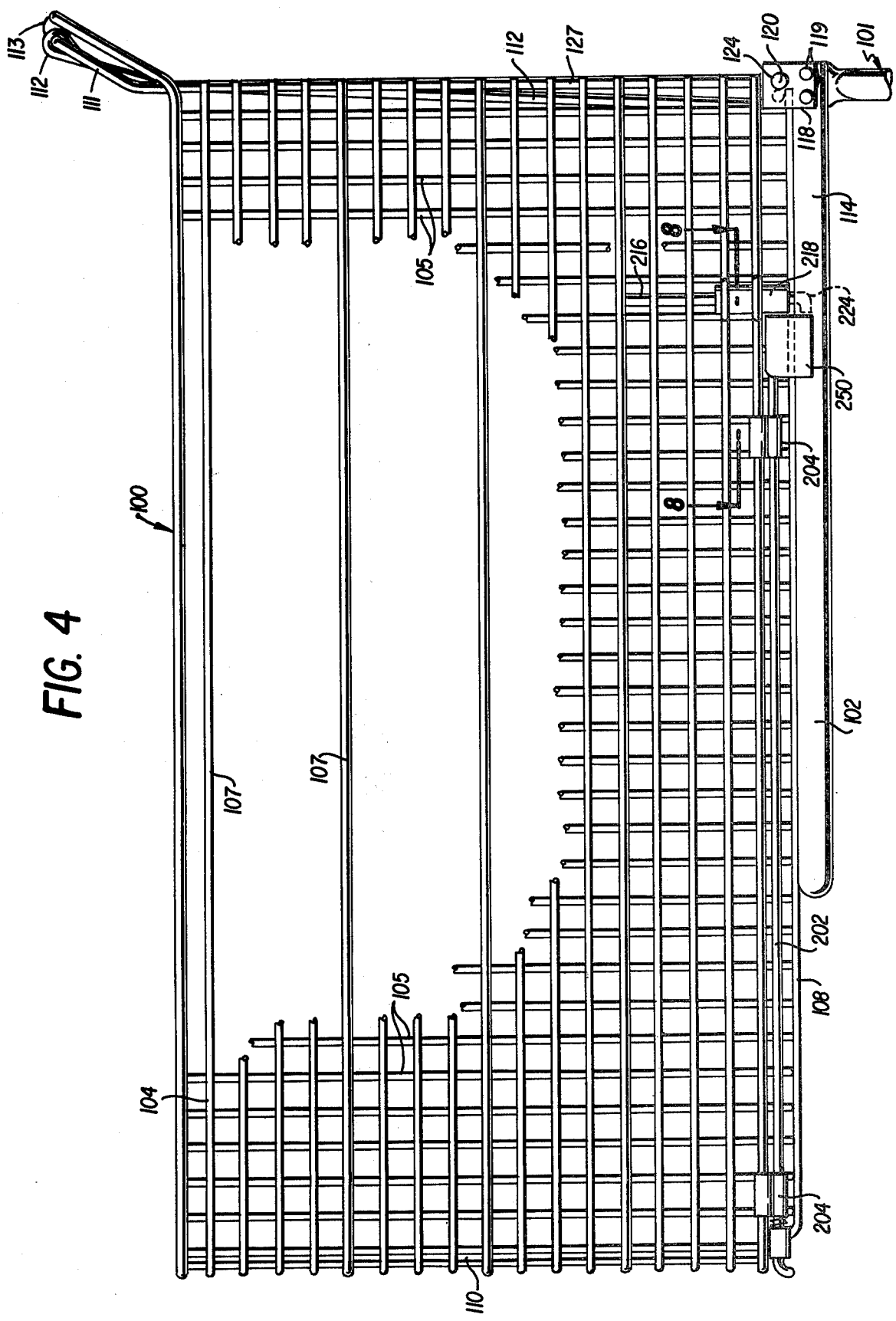
FIG. 4 is a side elevation view of the grocery cart according to this invention.
Figure 5:
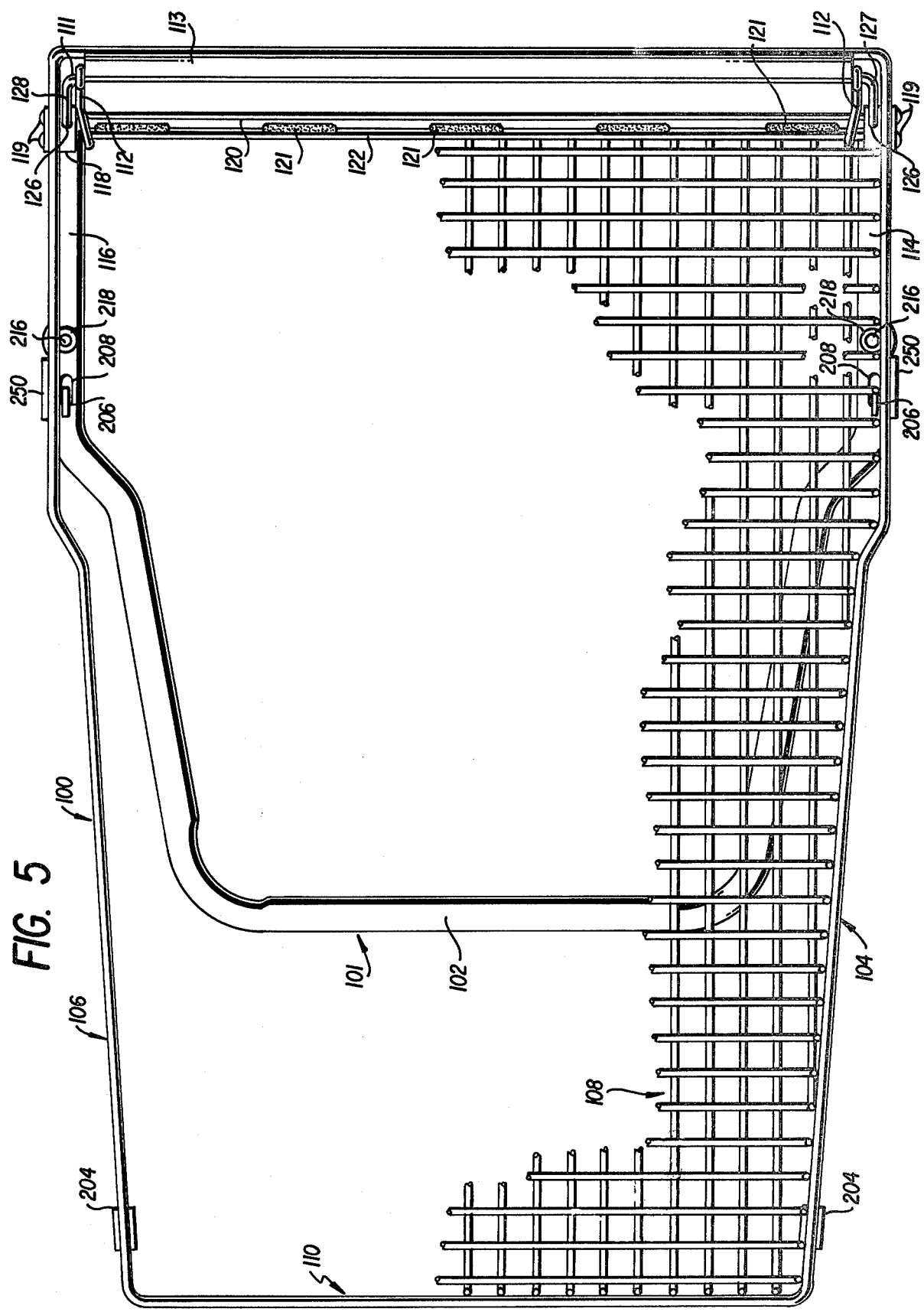
FIG. 5 is a top plan view of the grocery cart shown in FIG. 4.
Figure 6:
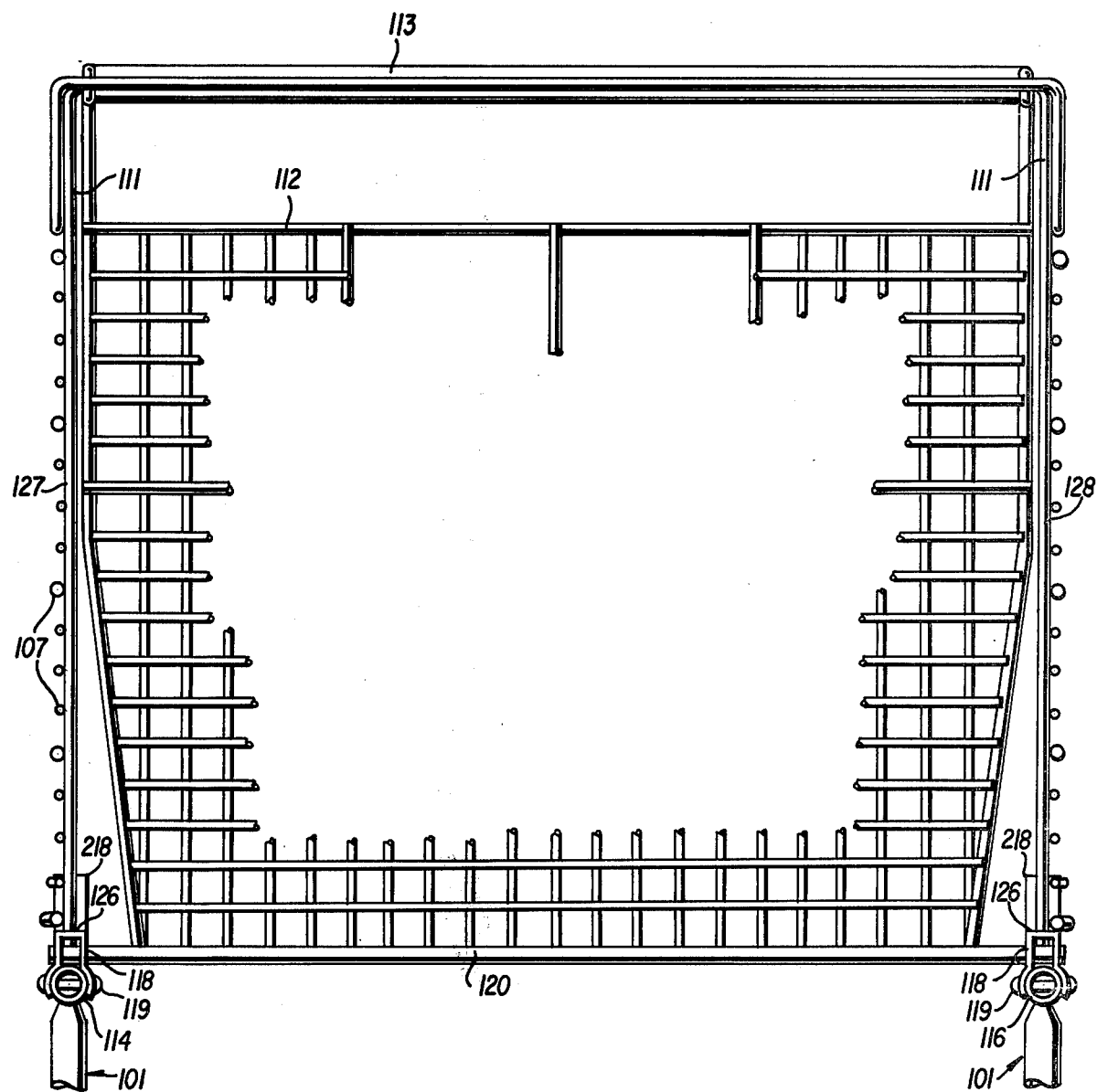
FIG. 6 is a rear elevation view of the grocery cart shown in FIG. 4.

Before discussing the nesting characteristics of the invention as shown in FIGS. 2 and 3, the latching and releasing mechanisms will be discussed. As shown in FIGS. 4 and 5, the telescoping shopping cart of the instant invention comprises a basket 100 attached to a standard wheeled cart frame 101. Basket 100 comprises opposite rectangular side panels 104, 106, a bottom panel 108, a front panel 110 and a pivotally attached rear panel 112. Rear panel 112 is pivotally attached to basket handle wire 111 which supports handle 113. Basket handle wire 111 extends vertically downward from each side of handle 113 forming rear vertical wires 127, 128 (FIG. 6). Frame 101 can be made of any suitable material including tubular steel or the like which is chrome plated for appearance and cleanliness. Basket 100 can also be manufactured of any suitable materials including metal or plastic, preferably of open wirework or plastic open lattice construction. If plastic construction is utilized, the basket can be manufactured of a polyethylene material whereby the side panels, the front panel and bottom panel are injection molded, integral with one another, in a single unit. Shown in the drawings is an open wirework constructed basket whereby the side and front panels include vertical frame wires 105 and horizontal frame wires 107.

The standard nestable wheeled cart frame 101 includes horizontal frame portion 102 comprising two tubular members (see FIGS. 3, 5) which are parallel for a portion of their length and then taper inwardly toward the front of the cart. The tubular members are tapered to permit nesting of the carts. Horizontal frame member 102 includes two free ends 114, 116 (see FIG. 6). Attached to each of these free ends by rivets 119 or other suitable means are respective bracket clips 118 (see FIGS. 2, 4, 6 and 7). Bracket clips 118 pivotally couple basket 100 to horizontal frame members 102 via hinging rod 120 (FIGS. 4, 5 and 6). As shown in FIGS. 4 and 5, hinging rod 120 extends along the rear edge of bottom panel 108 and is welded at points 121 to transverse bottom panel wire 122. Each free end of hinging rod 120 extends beyond the respective free end of bottom panel wire 122 and is inserted through horizontal openings 124 of basket 118 (see FIGS. 4, 6).

Bracket clips 118 also include a top opening 126 (see FIG. 6); the top opening of each bracket receives a respective rear vertical wire 127, 128 of side panels 104, 106 (see FIGS. 2, 4, 5, 6 and 7). Top openings 126 are made slightly larger than the vertical wires 127, 128 to permit movement of these wires during rotation of the basket.

As previously discussed, in order to produce a rectangular sided shopping cart capable of nesting, it is necessary that the basket must be slightly tilted during nesting. Furthermore, the side panels 104, 106 of the basket must be tapered inwardly to accommodate this nesting feature of the invention (see FIG. 5). As shown in FIGS. 2, 3 and 7, basket 100 is adapted by the novel features of this invention to be automatically rotated to a predetermined upper position so that it can be nested with the next forward basket. FIGS. 2 and 3 show carts 100, 200 and 300 during nesting; as can be seen, cart 200 and 100 and pivoted upwardly so that they can be nested within carts 300 and 200, respectively.

Basket 100 is urged to the predetermined upper position shown in FIG. 7 for nesting by a novel latching and releasing mechanism located on each side of the basket. The basket shown in FIG. 4 is in a horizontal use position and is maintained in that position, until released, by the latching mechanism shown in FIGS. 8, 9 and 12. Attached to the basket 100 is latching plate protrusion 206 located at opposed positions on each side of the basket (see FIG. 5). Protrusion 206 is attached to the basket by U-shaped releasing rod 202. Releasing rod 202 extends horizontally from protrusion 206 along side panel 104, front panel 110, and, finally along side panel 106 terminating at the other protrusion 206. Each free end of rod 202 is welded to each protrusion 206 at 207 (FIG. 12). Releasing rod 202 is slidably held to the basket by two metal guide clips 204 spaced along each side panel; these clips guide the movement of the rod in a forward and rearward direction. Guide clips 204 are mounted to the basket frame by engagement with horizontal frame wires 107 and by tabs 205 which are bent securely around vertical frame wires 105 (see FIGS. 8, 11).

When basket 100 is in its horizontal use position, protrusions 206 are received within opposed latching openings or slots 208 on each side of tubular horizontal portion 102 (see FIGS. 5, 8, 9 and 12). Each protrusion 206 includes a notched portion 210 which engages the horizontal latching edges 212 of openings 208 (see FIG. 9). While each notched portion 210 engages a respective latching edge 212, the basket 100 is maintained or locked in its horizontal use position. As shown in FIG. 9, the rearward deflection of releasing rod 202 causes notched portion 210 to disengage from its respective latching edge 212 thereby permitting the basket to be rotated upwardly.

The latching mechanism of the instant invention allows the basket to be automatically urged to its predetermined upper position and maintained at that position during nesting by the use of a pair of opposed latching compression springs 214 and J-shaped latching rods 216 attached to the respective side panels (see FIGS. 4, 5 and 9). The upper vertical end portion of each latching rod 216 is first inserted through spring 214 and latching spring housing 218, and then attached to the horizontal frame wires 107 of the side panels by welding or other suitable means (see FIG. 4). The upper portion of housing 218 is welded at 215 to latching rod 216 (see FIGS. 8, 9).

The lower end portion of latching rod 216 is received in opposed latching rod openings or slots 220 on each side of the tubular frame portion 102 (see FIGS. 8, 9). Latching rod openings 220 are rearwardly positioned adjacent to latching openings 208 along the tubular frame. The latching rod openings are made sufficiently large so that the lower curved portion 224 of the latching rod 216 can be inserted therein. The lower end of J-shaped latching rod 216 includes a shoulder 226 which is positioned to engage horizontal latching edges 228 when the cart is rotated to its upper predetermined position. The engagement of shoulders 226 and edges 228 prevents further rotation of the basket beyond the predetermined position.

Figure 13:
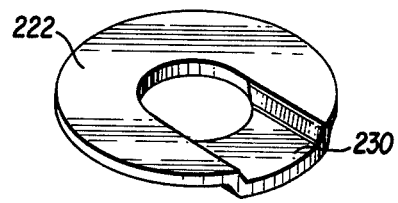
FIG. 13 is a perspective view of the retainer washer positioned between the latching spring and the horizontal tubular frame.

During assembly, a retainer washer 222 having the design shown in FIG. 13 is first threaded on rod 216 which has been welded to the basket and further welded to housing 218 at 215. Washer 222 is then pushed against spring 214 until washer 222 contacts spring housing 218 to compress spring 214 (see FIGS. 8, 9). With washer 222 forced against housing 218, the lower end 224 of latching rod 216 is inserted through latching rod openings 220. Latching rods 216 and basket 100 are then pushed forward so that shoulders 226 engage horizontal latching edges 228 to prevent upward movement of the basket caused by the force exerted by spring 214 against the horizontal upper edges 217 of housing 218. The depressed area 230 of washer 222 (see FIG. 13) which is shaped to conform to opening or slot 220 is then pressed into contact with slot 220. The compression force exerted by spring 214 maintains washer 222 in position. After this is done, rear vertical frame wires 127, 128 can then be inserted through the top openings 126 of bracket clips 118; hinging rod 120 is then inserted through side opening 124 of the bracket clips. The bracket clips are then riveted to the horizontal frame 102 by rivets 119.

As can be seen from FIGS. 7, 8 and 9, the rearward deflection of the protrusion plate 206 causes the notched portions 210 to be disengaged from latching edges 212. Consequently, the force exerted by latching compression spring 214 against the upper horizontal edge 217 of housing 218 will produce an upper movement of rod 216, and thereby cause rotation of the basket 100 about hinging rod 120. Basket 100 is permitted to rotate until shoulder 226 of rod 216 contacts horizontal edge 228 of openings 220, at which point, basket 100 is tilted to the predetermined upper position shown in FIG. 7.

Protrusion plates 206 are deflected to their rearward position by the activation of a releasing means comprising U-shaped releasing rod 202. As discussed previously, each free end of releasing rod 202 is welded to protrusion plate 206 and extend horizontally therefrom along the front and side panels. Rod 202 is maintained parallel to the horizontal frame wires 107 along the lower portion of the basket by four guide clips 204. As shown in FIG. 11, the clips are so constructed that rod 202 can move freely.

The releasing mechanism further includes a pair of opposed horizontally oriented compression releasing springs 232, each mounted within a respective releasing spring housing 234 at the lower forward portion of basket 100 (see FIGS. 4, 7 and 9). During assembly, the free ends of releasing rod 202 are threaded through the forward opening 236 (FIG. 9) of housing 234 and then threaded through spring 234 and guide clips 204 before mounting to the respective protrusion plates 206. Thereafter, the protrusion plates are welded to the free ends of rod 202, and spring housing 234 is welded to rod 202 at point 238 (see FIG. 9). Rather than welding, the front portion of releasing rod 202 can be made sufficiently curved to prevent further forward movement of housing 234 (see FIGS. 9, 10).

The rear end portion of compression spring 232 is compressed against the forward guide clips 204 while the front end portion of spring 232 is compressed against the vertical side edge 237 of spring housing 234 (see FIG. 9). Consequently, rod 202 is maintained in a forward rest position by the force of releasing spring 232 against edge 237 of housing 234; additional forward movement is prevented by the engagement of protrusion plate notches 210 against the vertical edges 240 of latching openings 208 (see FIG. 9).

When it is desired to nest basket 100 with basket 200 of the next forward cart (see FIGS. 2, 3), basket 100 is pushed against the next forward basket. As shown in FIG. 7, when the front portion of releasing rod 202 is pushed against the hinging rod 320 of the next forward cart, rod 202 is deflected rearwardly. The rearward deflection causes rearward movement of protrusion plate 206 so that notches 210 are disengaged from horizontal latching edges 210 (see FIG. 9), thereby forcing basket 100 to be rotated to its predetermined upper position by the compression force of vertical latching spring 214 against horizontal edge 217 of housing 218. Also shown in FIGS. 7 and 12 are opposed guide plates 250 welded to tubular frame 102 at 252 in juxtaposition with respective protrusion plates 206. The guide plates prevent racking of the basket which could cause disalignment of the basket in relation to frame 102.

Obviously, many modifications and variations of the above-described embodiment will become apparent to those skilled in the art from the reading of this disclosure. Although a basket having rectangular side panels has been disclosed, other basket designs can be utilized wherein each opposed side panel has opposed edges which are parallel (e.g., parallelepiped). Further, the locking and releasing mechanism of the instant invention could be adapted for use in other shopping cart designs including over-the-counter cart baskets. Rather than rotating the over-the-counter basket from a horizontal position to a vertical position for nesting, the releasing and latching mechanisms can automatically tilt the basket to a predetermined upper position for nesting through the rear gate of the next forward over-the-counter basket.

Although a wire constructed basket has been shown in the drawings, a basket constructed of plastic could also be utilized wherein wire rods are utilized for reinforcement and coupling the basket to the cart frame. Wire reinforcing rods could also be utilized for coupling the latching and releasing mechanism to the basket. It should be realized that the invention is not limited to the particular apparatus disclosed, but its scope is intended to be given only by the scope of the appended claims.

I claim:
1. A nestable shopping cart comprising:
    a basket having opposed side panels, each side panel having opposed edges which are parallel;
    a wheeled frame;
    hinging means pivotally coupling said basket to said frame for permitting said basket to be rotated from a horizontal use position to a predetermined upper position for nesting;
    latching means releasably coupling said basket to said frame for maintaining said basket in a horizontal use position and for biasing said basket to said predetermined upper position when said basket is uncoupled from said frame; and
    release means coupled to said latching means for releasing the latching means during nesting whereby said basket is rotated to said predetermined upper position.
2. A nestable shopping cart comprising:
    a basket;
    a wheeled frame;
    hinging means pivotally coupling said basket to said frame for permitting said basket to be rotated from a horizontal use position to a predetermined upper position for nesting;
    latching means releasably coupling said basket to said frame for maintaining said basket in a horizontal use position and for biasing said basket to said predetermined upper portion when said basket is uncoupled from said frame; and
    release means coupled to said latching means for automatically releasing the latching means during nesting whereby said basket is automatically rotated to said predetermined upper position.
3. The cart of claim 1 or 2 wherein said basket further comprises a front panel, a pivotally attached rear panel, and a bottom panel; and
    said hinging means comprises a hinging rod substantially coextensive with the rear edge of said bottom panel and attached thereto, wherein said hinging rod engages said hinging means.
4. The cart of claim 3 wherein said frame comprises a horizontal member;
    said hinging means further comprising a pair of opposed brackets, each bracket being attached to said horizontal member; and
    each of said brackets comprising a first opening for receiving a respective free end of said hinging rod.
5. The cart of claim 4 further comprising a rear vertical wire extending along the rear edge of each side panel and terminating in a free end, wherein each vertical wire engages a respective one of said brackets.
6. The cart of claim 5 wherein each of said brackets comprises a second opening for receiving a respective free end of said vertical wire, said second opening being slightly larger than said vertical wire to permit movement of said wire during rotation of said basket.

7. The cart of claim 1 or 2 wherein said latching means is spring-loaded to urge said basket to said predetermined upper position.

8. The cart of claim 7 wherein said frame comprises a horizontal member having a first pair of opposed openings, each opening having a first latching edge; and said latching means further comprising a pair of opposed protrusions attached to said basket, each received in a respective one of said first openings.

9. The cart of claim 8 wherein each of said protrusions has a notched portion which engages said fist latching edge when said basket is in a horizontal use position.

10. The cart of claim 9 wherein said horizontal member further comprises a second pair of opposed openings each having a second latching edge; and said latching means further comprising a pair of opposed latching rods attached to said basket, each received in a respective one of said second openings.

11. The cart of claim 10 wherein each of said latching rods has a shoulder portion which engages said second latching edge when said basket is urged to said predetermined upper position.

12. The cart of claim 11 wherein said latching means further comprises spring means coupled to said latching rod to urge said basket to said predetermined upper position.

13. The cart of claim 12 wherein said shoulder portion is spaced a predetermined distance below said latching edge when said basket is in a horizontal use position, whereby said shoulder portion is urged toward said latching edge when said release means is activated.

14. The cart of claim 1 or 2 wherein said release means comprises a releasing rod attached to said basket and positioned to contact a next forward cart during nesting.

15. The cart of claim 14 wherein said releasing rod comprises a substantially U-shaped rod in which each of its free ends is attached to said latching means.

16. The cart of claim 15 wherein said basket comprises a front panel, a rear panel, and a bottom panel;

said U-shaped rod extending horizontally along said front and side panels; and said U-shaped rod adapted to deflect rearwardly upon impact with said next forward cart during nesting.

17. The cart of claim 16 wherein said basket further comprises guide means positioned along said side panels for guiding said U-shaped rod; and wherein said release means is spring-loaded to urge said U-shaped rod toward a forward rest position.

18. The cart of claim 17 wherein said release means further comprises a spring releasing means to urge said U-shaped rod to said forward rest position.

19. The cart of claim 16 wherein said frame comprises a horizontal member having a first pair of opposed openings, each opening having a first latching edge;

said latching means further comprising a pair of opposed protrusions attached to said basket, each received in a respective one of said first openings;

wherein each of said protrusions has a notched portion which engages said first latching edge when said basket is in a horizontal use position;

wherein each of said free ends is attached to a respective protrusion, whereby said notched portion is disengaged from said first latching edge when said U-shaped rod is deflected upon impact.

20. The cart of claim 1 or 2 wherein said basket is primarily of wire-work construction.

21. The cart of claim 1 or 2 wherein said basket is primarily constructed of plastic material.

* * * * *